(12) United States Patent
Uchida et al.

(10) Patent No.: US 6,275,226 B1
(45) Date of Patent: Aug. 14, 2001

(54) APPLICATION WINDOW DEVELOPMENT SUPPORTING SYSTEM AND METHOD STORAGE

(75) Inventors: Yoshiko Uchida; Takashi Itaya; Koichi Shimazaki; Tsuyoshi Washizaki; Keitaro Inoue; Keiji Hyodo, all of Yokohama; Kazuya Kifuji, Chigasaki; Seiichi Takeguchi, Yokohama, all of (JP)

(73) Assignees: Hitachi, LTD, Tokyo; Hitachi Software Engineering Co., Ltd., Yokohama, both of (JP)

( * ) Notice: Subject to any disclaimer, the term of this patent is extended or adjusted under 35 U.S.C. 154(b) by 0 days.

(21) Appl. No.: 09/218,035

(22) Filed: Dec. 22, 1998

(30) Foreign Application Priority Data

Dec. 26, 1997 (JP) ................................................. 9-359281

(51) Int. Cl.[7] .................................................. G06F 13/00
(52) U.S. Cl. ............................ 345/335; 345/333; 345/334
(58) Field of Search ................................... 345/326, 334, 345/333, 340, 348, 349, 335

(56) References Cited

U.S. PATENT DOCUMENTS

| | | | |
|---|---|---|---|
| 5,600,778 | * 2/1997 | Swanson et al. | 345/333 |
| 5,673,401 | * 9/1997 | Volk et al. | 345/327 |
| 5,903,455 | * 5/1999 | Sharpe, Jr. et al. | 700/83 |
| 6,006,230 | * 12/1999 | Ludwig et al. | 707/10 |
| 6,044,218 | * 3/2000 | Faustini | 717/2 |

\* cited by examiner

Primary Examiner—Raymond J. Bayerl
Assistant Examiner—Tadesse Hailu
(74) Attorney, Agent, or Firm—Antonelli, Terry, Stout & Kraus, LLP (57) ABSTRACT

The efficiency of development of an application program constructed of a plurality of application windows utilizing GUI controls is improved. By causing a GUI control property defining information selector to select GUI control property defining information defined by a GUI control property defining information definer, the selected GUI control property defining information is reflected upon the property of a GUI control used in an application window editor. When the GUI control property defining information is changed by the GUI control property defining information definer, GUI control information in synchronism with the changed GUI control property defining information is searched from GUI control information used in the application window editor and GUI control property defining information after changing is reflected upon the searched GUI control property information.

11 Claims, 8 Drawing Sheets

FIG. 7

APPLICATION WINDOW DEVELOPMENT SUPPORTING SYSTEM AND METHOD STORAGE

BACKGROUND OF THE INVENTION

The present invention relates to system and method for supporting development of application windows and more particularly, to development supporting system and method which utilize a client/server system for an application constructed of the application windows using graphical user interface GUI controls. The invention also relates to a storage medium for support of application window development.

VisualBasic, Visual C++ of Microsoft Corp. and APP-GALLERY of Hitachi Ltd. have been available as development supporting tools used when the application windows using GUI controls are developed, the application windows using GUI controls can be prepared interactively. For setting of properties of the GUI controls used in the application windows, a method has been used in which the properties are set by using GUI control property setting dialogues in respect of individual GUI controls as shown in "Preparation of Windows by a Form Editor" (APPGALLERY user's guide (3020-7-425), pp. 18–19).

Also available as a relevant technique is a method of changing the property of a GUI control used for an application window in dependence upon the property of a form corresponding to the window, as shown in JP-A-9-114621.

In conventional techniques, however, any method cannot be found in which properties common to GUI controls utilized in an application are controlled collectively and information about the common properties is set to the property of a GUI control utilized during application window development independently of other properties. Any method cannot be found, either, which can collectively change properties in respect of individual GUI controls.

In development of an application constructed of a plurality of application windows each using GUI controls, if application windows are prepared by a plurality of persons without settling properties common to the GUI controls used in the application, resulting properties of the GUI controls will differ from each other in conformity with preference of each person to make the application windows inconsistent. When the properties common to the GUI controls used in the application are settled to make outwards of the individual application windows consistent, a more consistent and easy-to-operate application can be prepared.

For the sake of making outwards of application windows consistent, a method is available in which application window specifications are designed before developing the application windows, values of properties owned by GUI controls used in the application windows are prescribed with respect of individual types of GUI controls, and the properties of GUI controls are set by making reference to the application window specifications with respect of the individual GUI controls used during development of the application windows.

Default values are settled for properties of GUI controls with respect of individual types of GUI controls pursuant to application window development tools used and when a GUI control is newly added to an application window, the default value is always set in the property of the GUI control, with the result that there occurs necessarily the work of re-setting properties of GUI controls by consulting the specifications. In this case, a user must independently set a plurality of properties in the GUI controls used, raising a problem that inconsistency with the specifications is liable to occur owing to human errors.

In addition, the change of properties common to GUI controls used in common to individual application windows may often take place during application development. In that case, the user must carry out the work of finding out of the individual application windows all GUI controls which are required to be changed in properties concomitantly with the change of common properties so as to re-set properties with respect of the individual GUI controls, thus raising a problem that each time that properties of the GUI controls used in common are changed, the user must repetitively apply a plurality of operations to the individual controls which consume much time.

SUMMARY OF THE INVENTION

In development of an application program constructed of a plurality of application windows utilizing GUI controls, the present invention has an object to improve the efficiency of development of application windows so as to improve the efficiency of development of the application program by simplifying the operation of setting properties with respect of individual GUI controls through the use of GUI control property defining information according to which properties of GUI controls used in the individual application windows are defined on a server and when the GUI control property defining information on the server is redefined, by simplifying the work of re-setting the properties of the GUI controls through collective change of properties of the GUI controls utilizing the GUI control property definition.

To accomplish the above object, according to the present invention, the function is provided to define properties of a plurality of GUI controls as one set on a server and control a plurality of pieces of defining information to reflect selected GUI control property defining information as the property of a GUI control newly utilized by an application window editor adapted to develop an application window on the side of a client and the function is provided to collectively reflect the latest GUI control property defining information upon properties of all GUI controls utilizing the GUI control property defining information.

Namely, in a system for support of development of application windows utilizing GUI controls having a server for collectively controlling resources utilized in application program development and clients for performing development by utilizing the resources, the server includes storage means for storing properties common to GUI controls used in application windows and each of the clients includes a GUI control property defining information definer for defining the common properties of GUI controls to be stored in the storage means, an application window editor for developing an application window by using the GUI controls in combination, and control means for reflecting the common properties of GUI controls stored in the storage means upon the property of a GUI control to be newly added to the application window editor. There are also provided retrieval means for retrieving a GUI control using the common properties of GUI controls which prevail before changing when the common properties of GUI controls are changed by the GUI control property defining information definer and change means for changing the property of the retrieved GUI control to common properties which prevail after changing.

According to the present invention, a system of supporting development of application windows utilizing GUI controls comprises a GUI control property defining information definer for defining properties common to GUI controls, first selection means for selecting a GUI control which synchronizes with the common properties of GUI controls defined by the GUI control property defining information definer, and change means for changing the property of the GUI control selected by the first selection means to the common properties defined by the GUI control property defining information definer. Second selection means is also provided for selecting the property which synchronizes with the selected GUI control from the common properties of GUI controls defined by the GUI control property defining information definer. The GUI control property defining information definer defines the common properties of GUI controls in respect of individual types of GUI controls.

According to the present invention, a method of supporting development of application windows utilizing GUI controls comprises the steps of defining properties common to GUI controls, selecting a GUI control which synchronizes with the common properties, retrieving the GUI control which synchronizes with the common properties, and changing the property of the retrieved GUI control to the precedently defined common properties. The method further comprises the step of selecting the property which synchronizes with the retrieved GUI control from the common properties of GUI controls defined in the step of defining common properties of GUI controls. The method further comprises the step of displaying the GUI control retrieved in the step of retrieving a GUI control which synchronizes with the common properties.

According to the present invention, a storage medium stores a program of supporting development of application windows utilizing GUI controls, and the development supporting program comprises the steps of defining properties common to GUI controls, selecting a GUI control which synchronizes with the common properties, retrieving the GUI control which synchronizes with the common properties, and changing the property of the retrieved GUI control to the precedently defined common properties. The development supporting program further comprises the step of selecting the property which synchronizes with the retrieved GUI control from the common properties of GUI controls defined in the step of defining common properties of GUI controls.

DESCRIPTION OF THE PREFERRED EMBODIMENTS

Figure 6:
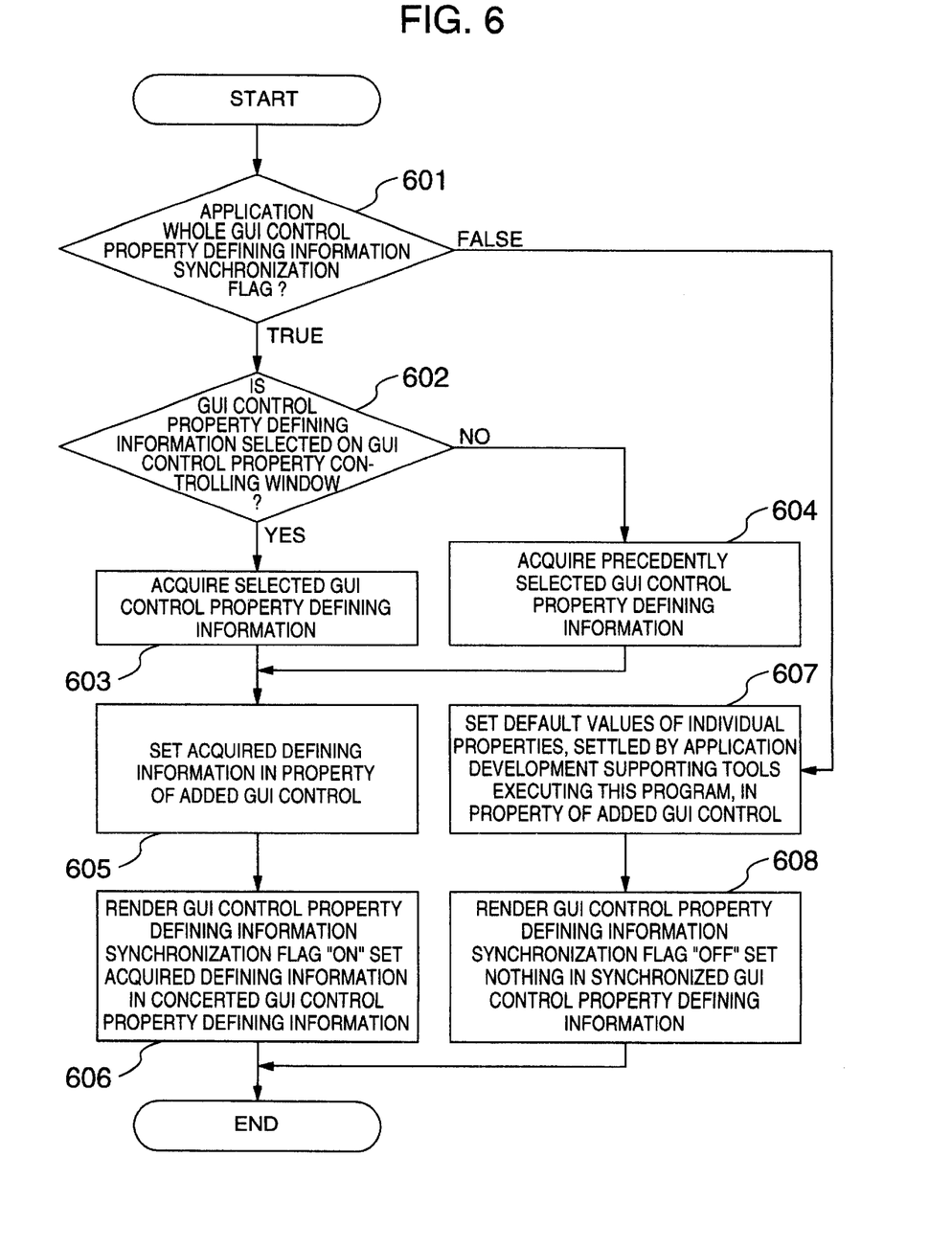
FIG. 6 is a flow chart useful to explain the process according to an embodiment of the invention.
Figure 7:
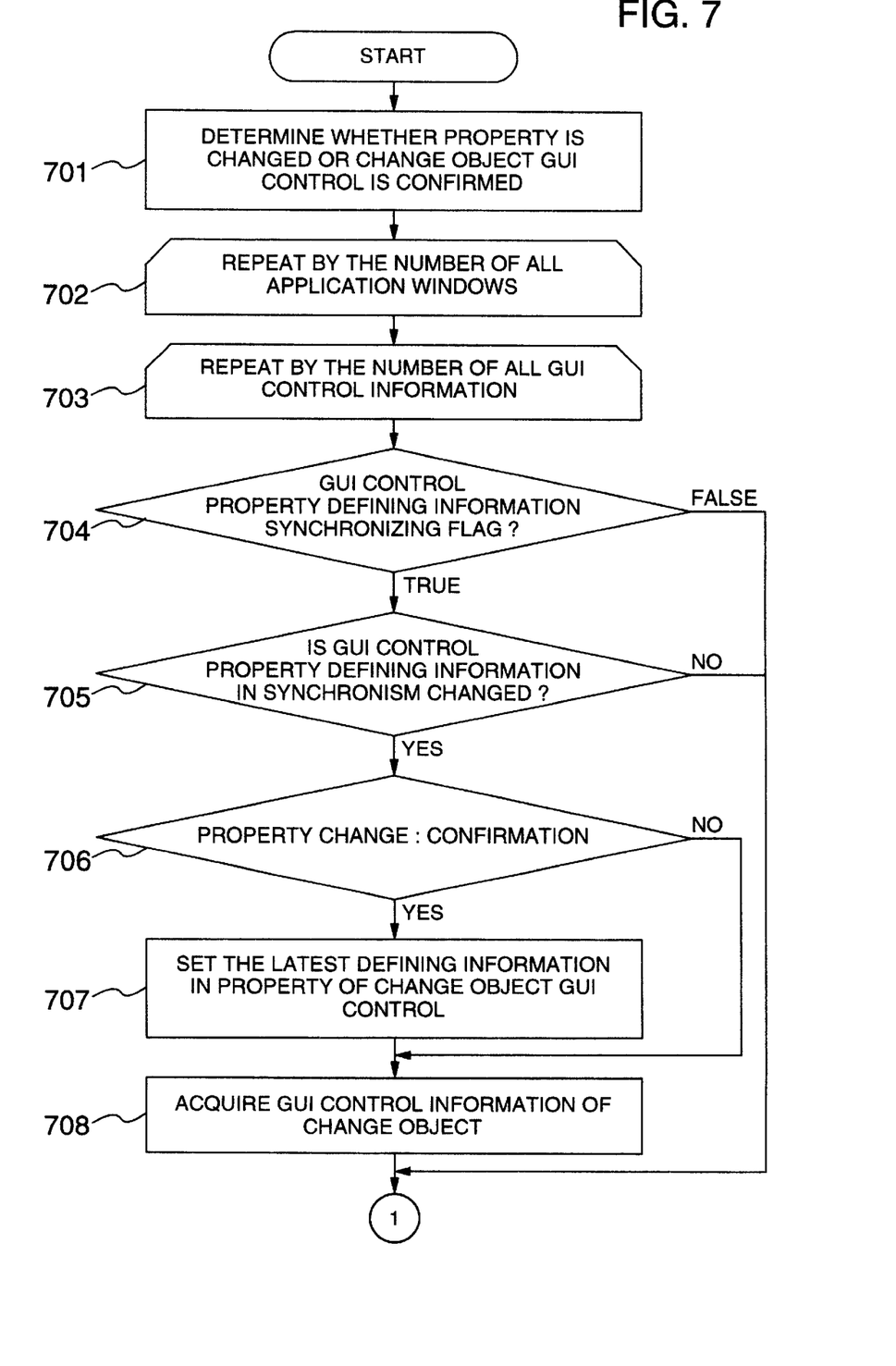
FIG. 7 is a flow chart useful to explain the process according to an embodiment of the invention.
Figure 8:
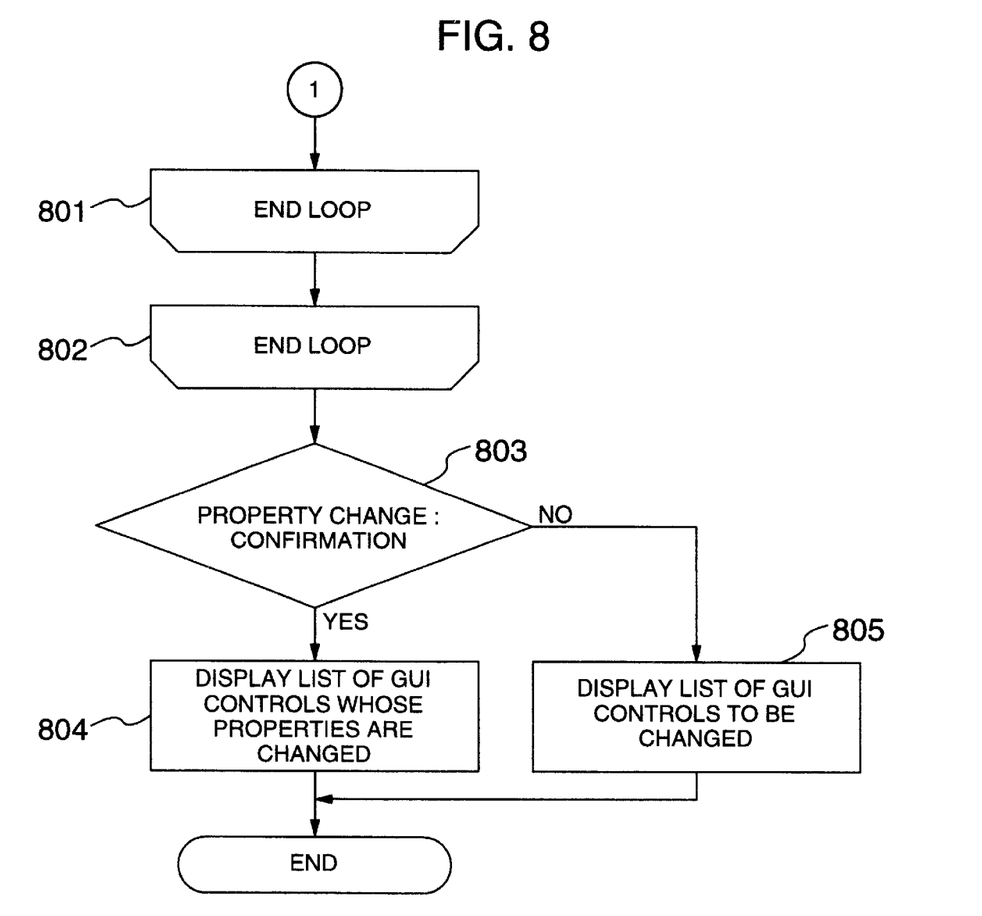
FIG. 8 is a flow chart useful to explain the process according to an embodiment of the invention.

The present invention will now be described by way of example with reference to the accompanying drawings. FIGS. 6, 7 and 8 show the process flows according to an embodiment of the present invention by using flow charts.

Figure 1:
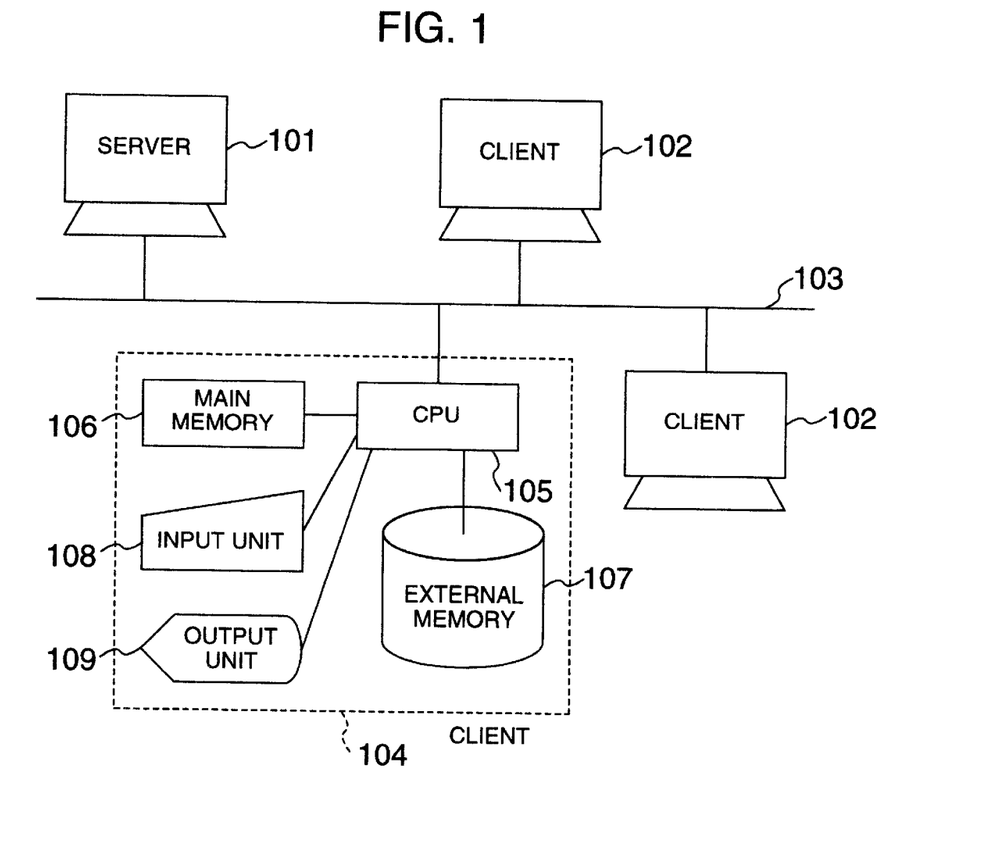
FIG. 1 is a block diagram showing the construction of hardware of the present invention.

Referring first to FIG. 1, there is illustrated, in block form, the hardware construction of a system to which the present invention is applied. The invention is executed on a client/server system having a server 101 connected to a plurality of clients 102 through a network 103. As shown at a structural block 104 of client, the client 102 includes a CPU 105 for executing programs of the present invention, a main memory 106 for temporarily storing selected GUI control property defining information, an external memory 107 for storing previously selected GUI control property defining information or information about development of an application window undergoing development, an input unit 108 through which a user inputs the GUI control property defining information or the development information of an application window, and an output unit 109 for displaying the defined GUI control property defining information or the application window being developed. The server 101 has a section adapted to store GUI control property defining information inputted through the input unit 108.

Figure 2:
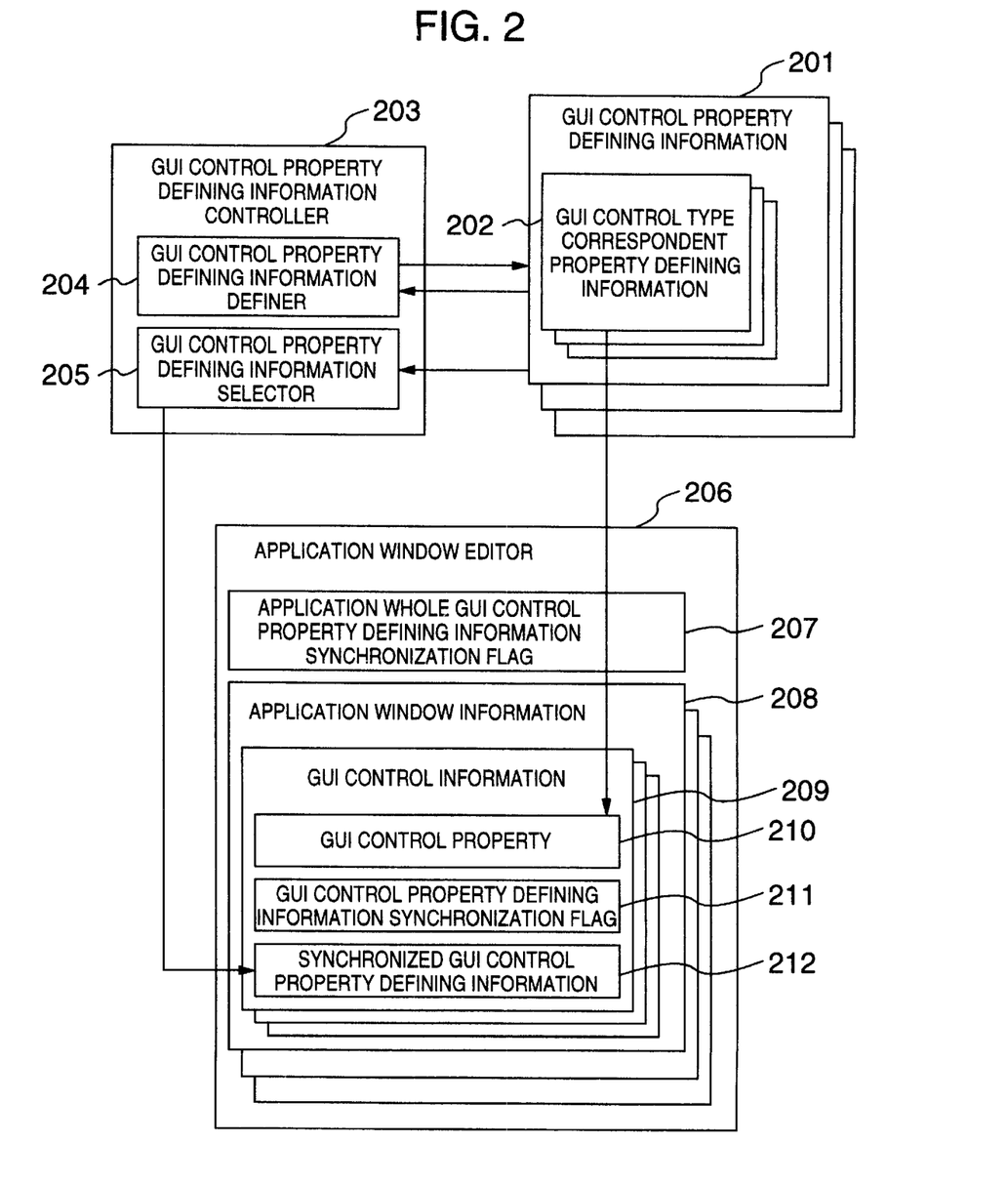
FIG. 2 is a diagram showing a functional architecture according to an embodiment of the invention.

Software of the present invention is structured as shown in FIG. 2. More particularly, data 201 to be controlled by the server 101 has property defining information of GUI controls. The GUI control property defining information 201 is defined in a unit of an application program or in a unit of function of a window of the application program For example, the GUI control property defining information 201 includes the font and size of letter, the line width, the line type and the like. Each GUI control property defining information 201 consists of a plurality of pieces of GUI control type correspondent property defining information 202. One GUI control property defining information 201 can have a desired number of GUI control type correspondent property defining information 202 and one GUI control type correspondent property defining information 202 can have a desired number of property information. A GUI control property defining information controller 203 in the form of a program executed by the CPU 105 includes a GUI control property defining information definer 204 which has the function of defining the GUI control property defining information 201 to store it in the server 101 or editing the defined GUI control property defining information 201 stored in the server 101 to again store the edited information in the server 101, and a GUI control property defining information selector 205 which has the function of inspecting/selecting the GUI control property defining information 201 stored in the server 101. An application window editor 206, also in the form of a program executed by the CPU 105, for editing an application window holds a flag 207 for concerting all GUI control property defining information in an application with each other (hereinafter simply referred to as an application whole GUI control property defining information synchronization flag 207) and pieces of application window information 208 with respect of individual GUI application windows. The application whole GUI control property defining information synchronization flag 207 provides an indication as to whether the GUI control property defining information 201 stored in the server 101 is utilized during application window editing.

The application whole GUI control property defining information synchronization flag 207 is a flag which is set or rendered "on" in advance when during development of a new window of application program, the application window utilizes the GUI control property defining information 201 stored in the server 101.

Each application window information 208 includes pieces of GUI control information 209 provided with respect of individual GUI controls used on each application window. Each GUI control information 209 has GUI control property information 210 containing a plurality of property information of a GUI control, a GUI control property defining information synchronization flag 211 for providing an indication as to whether the GUI control property defining information 201 stored in the server 101 is utilized, and synchronized GUI control property defining information 212 for providing an indication as to which GUI control property defining information 201 is utilized when the GUI control property defining information 201 is utilized. Hereinafter, a condition in which GUI control property defining information 201 is set in the property of a GUI control and when the GUI control property defining information 201 is changed, the change is reflected upon the property of that GUI control will be described by an expression that the property of that GUI control synchronizes with the GUI control property defining information 201.

Figure 3:
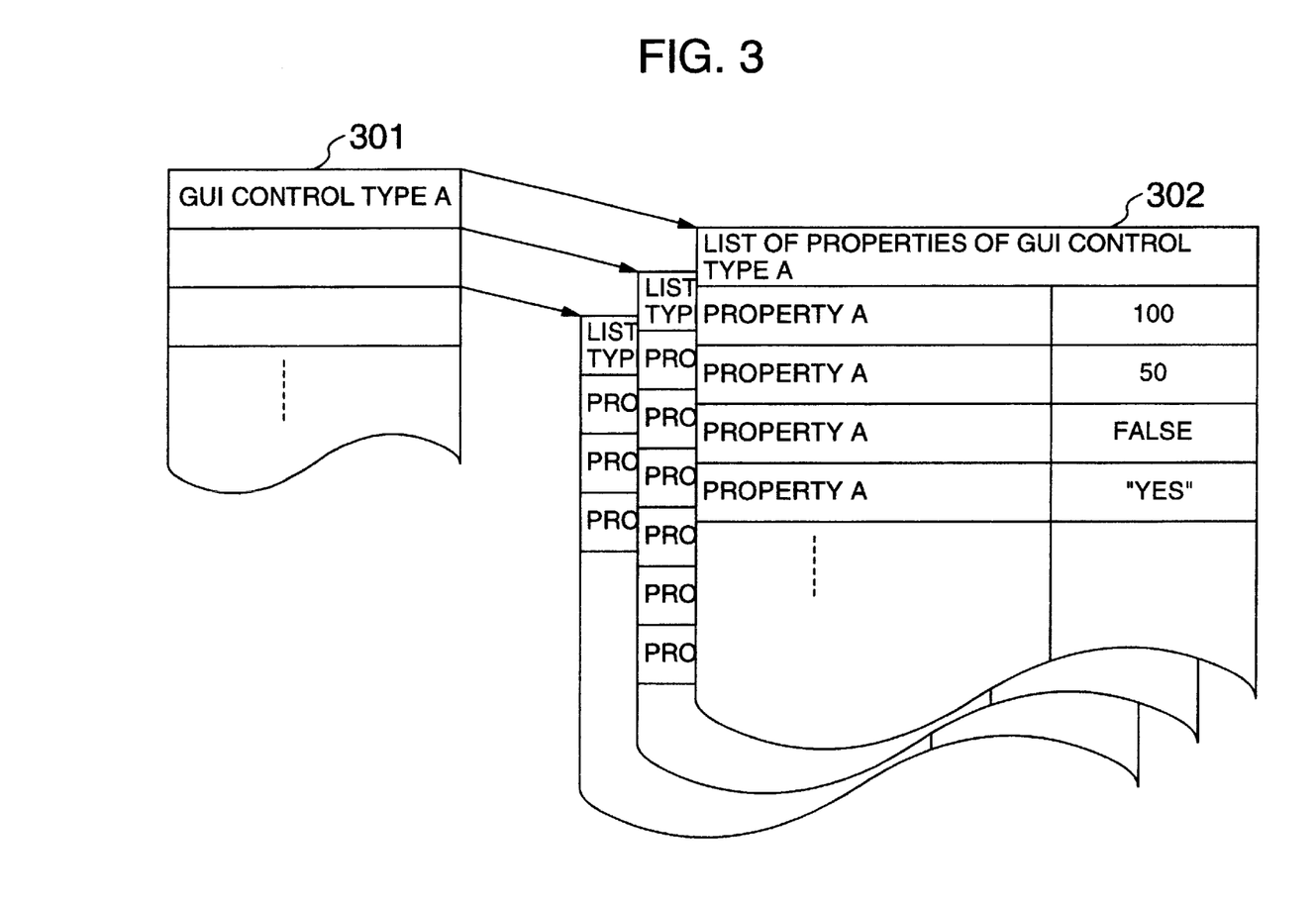
FIG. 3 is a diagram showing GUI control property defining information.

Referring to FIG. 3, an example of the contents of the GUI control property defining information 201 is depicted. A list of GUI control types contained in GUI control property defining information 201 is provided at a GUI control type table 301 so that a GUI control type correspondent property table 302 which defines properties with respect of individual types may be pointed by each item of the GUI control type table 301. The GUI control type correspondent property table 302 is an example showing the GUI control type correspondent property defining information 202.

Figure 4:
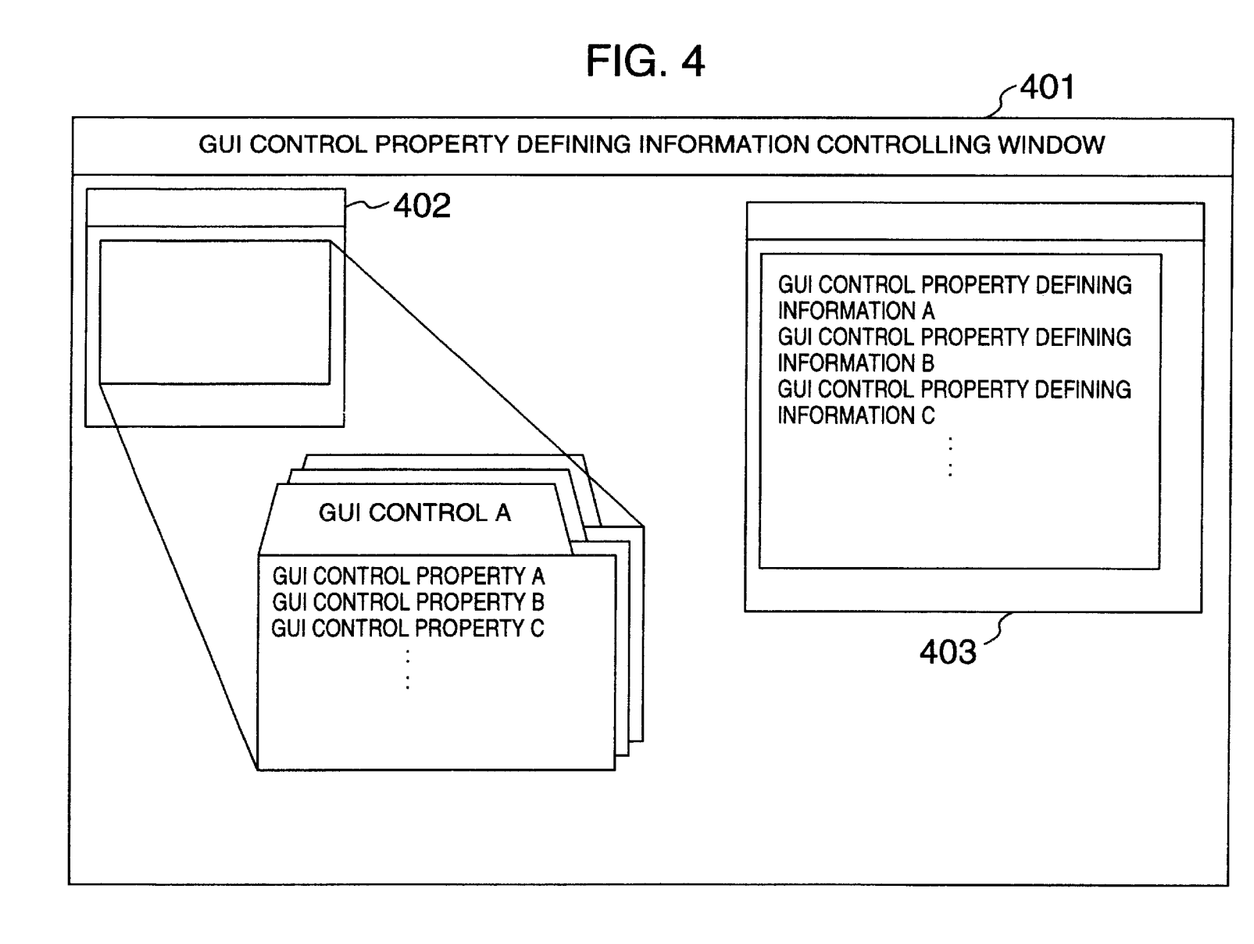
FIG. 4 is a diagram showing an example of a GUI control property defining information controlling screen.

Referring to FIG. 4, there is illustrated a GUI control property defining information controlling screen. A screen 401 is displayed on the output unit 109 by means of the GUI control property defining information controller 203. The GUI control property defining information controlling screen 401 has a GUI control property defining window 402 which defines new GUI control property defining information 201 indicated by the GUI control property defining information definer 204 or changes existing GUI control property defining information 201, and a GUI control property defining information list 403 which makes a list of GUI control property defining information 201 stored in the server 101 and indicated by the GUI control property defining information selector 205.

In the GUI control property defining information defining window 402, the name of new GUI control property defining information, the GUI control type contained in the new GUI control property defining information and values of properties of the individual GUI control types can be set. In the GUI control property defining information list 403, all GUI control property defining information 201 stored in the server 101 are inspected and besides, by selecting any GUI control property defining information 201, the property of a GUI control used when the application window editor 206 edits an application window can be set in synchronism with the GUI control property defining information 201. When the GUI control property defining information 201 selected on the GUI control property defining information list 403 is changed, the changed GUI control property defining information 201 is written in the external memory 107. This ensures that even when the GUI control property defining information controlling screen 401 is not displayed, the GUI control property information 201 to be concerted with the property of the GUI control used when the application window editor 206 edits the application window can be known.

Figure 5:
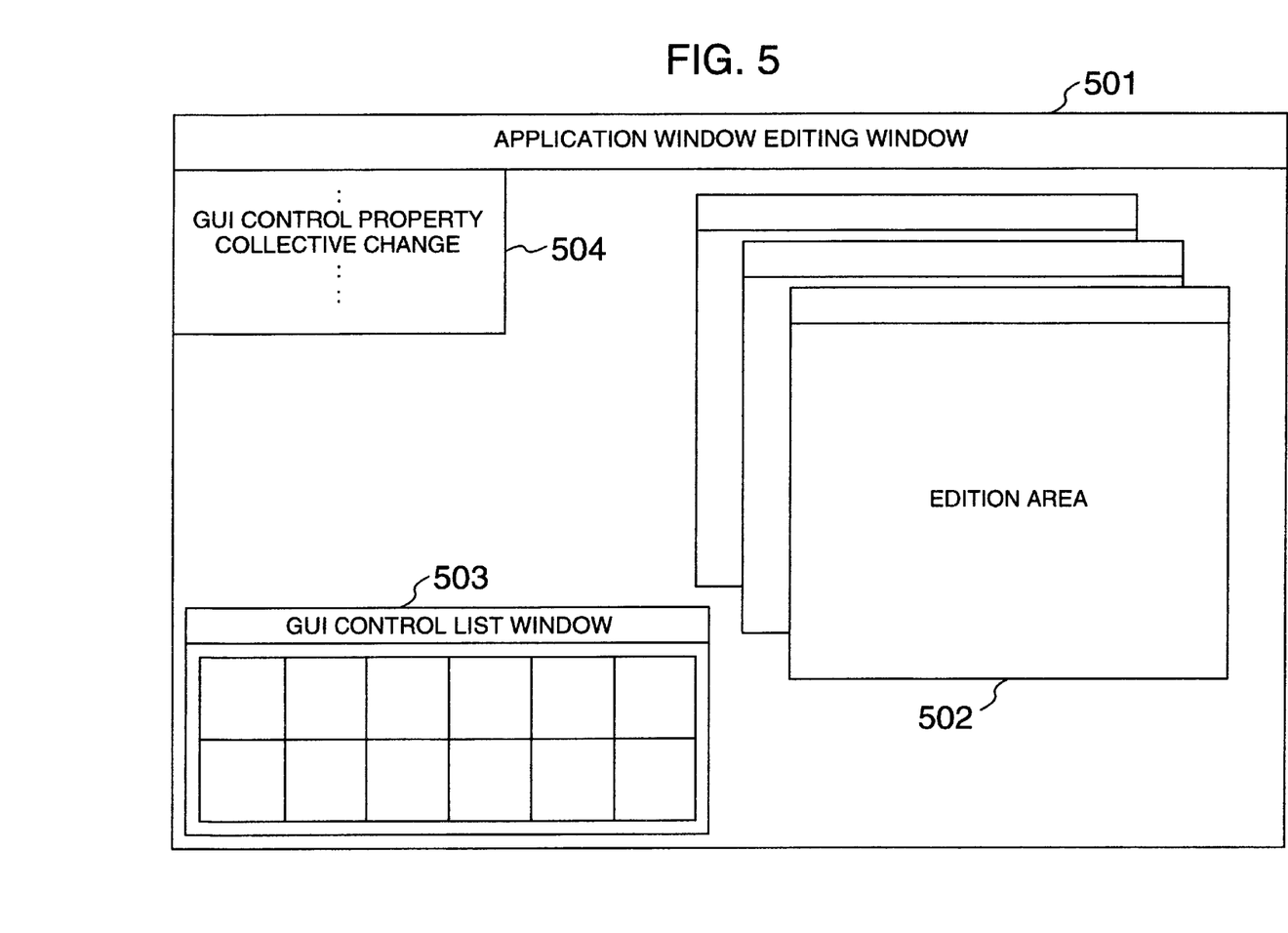
FIG. 5 is a diagram showing an example of an application window editing screen.

Referring to FIG. 5, there is illustrated an application window editing screen. An application window editing screen 501 to be displayed on the output unit 109 by means of the application window editor 206 has an edition areas 502 provided with respect of individual application windows to be prepared and a GUI control list window 503 for selection of a GUI control used during application window edition. The user selects a GUI control from the GUI control list window 503. For example, a GUI control is set and settled on the application window edition area 502 by dragging and dropping an icon (not shown) indicative of the GUI control shown in the GUI control list window 503 by means of, for example, a pointing device.

FIG. 6 is a flow chart useful to explain the process for reflecting GUI control property defining information 201 upon the property of a new GUI control to be added when the new GUI control is added to the application window edition area 502.

Firstly, a GUI control is newly added to the application window edition area 502 from the GUI control list window 503. Taking the opportunity of the addition of the GUI control, the application window editor 206 checks the application whole GUI control property defining information synchronization flag 207 of the application window editor 206 (step 601). When the application whole GUI control property defining information synchronization flag 207 is "on", the GUI control property defining information controlling window 401 is displayed and it is checked, through the GUI control property defining information list 403, whether any GUI control property defining information 201 is selected (step 602). This checking step is for confirming the GUI control property defining information 201 selected by the GUI control property defining information selector 205 and can be carried out through any method which can decide whether the property defining information is selected. When any GUI control property defining information 201 is selected through the GUI control property defining information list 403 in step 602, the selected GUI control property defining information 201 is acquired as GUI control property defining information 201 to be concerted with the newly added GUI control (step 603). If, in step 602, the GUI control property defining information controlling window 401 is not displayed or if the GUI control property defining information controlling screen 401 is displayed but any GUI control property defining information 201 is not selected through the GUI control property defining information list 403, GUI control property defining information 201, which has been recorded on the external memory 107 when it has been selected through the GUI control property defining information list 403 during preceding display of the GUI control property defining information controlling screen 401, is acquired as GUI control property defining information 201 to be concerted with the newly added GUI control (step 604). The GUI control type correspondent property defining information 202 corresponding to the additional GUI control type of GUI control property defining information 201 acquired in the step 603 or 604 is reflected upon the property of the newly added GUI control and the resulting property is stored in GUI control property information 210 of the GUI control information 209 added to application window information 208 (step 605). At that time, the GUI control property defining information synchronization flag 211 of the GUI control information 209 is set to "on" and the GUI control property defining information 201 acquired in the step 603 or step 604 is set in the synchronized GUI control property defining information 212 (step 606).

When the application whole GUI control property defining information synchronization flag 207 is "off" in the step 601, the GUI control property defining information 201 stored in the server 101 is not reflected upon the property of the newly added GUI control but default values of properties of the added GUI control type, which are determined by means of application window development tools, are set to GUI control property information 210 of the GUI control information 209 of the newly added GUI control (step 607) and the GUI control property defining information synchronization flag 211 is set to "off", so that nothing is set to the synchronized GUI control property defining information 212 (step 608).

FIGS. 7 and 8 are flow charts useful to explain the process in which when the GUI control property defining information 201 stored in the server 101 is changed, the changed GUI control property defining information 201 is reflected upon the property of a GUI control which synchronizes with the changed information 201. When the GUI control property defining information 201 stored in the server 101 is changed by the GUI control property defining information definer 204 of the GUI control property defining information controller 203, the process shown in FIGS. 7 and 8 is started by selecting a GUI control property collective change menu 504 of the application window editing screen 501. Firstly, a dialogue for confirmation of GUI control property collective change is displayed and selection is made as to whether the changed GUI control property defining information 201 is reflected upon GUI control property information 210 of the GUI control information to be concerted with the changed information 201 or the GUI control to be changed is confirmed without reflecting the information 201 (step 701). Subsequently, the application window editor 206 checks all GUI control information 209 of all application window information 208 and when the GUI control property defining information synchronization flag 211 is "on" and the synchronized GUI control property defining information 212 is identical to the changed GUI control property defining information 201 and then the property change is selected in step 701, the latest GUI control property defining information 201 is reflected upon GUI control property information 210 of the retrieved GUI control information 209 (step 707). The retrieved object GUI control information 209 is acquired for use as listing display (step 708). When the property change is selected in the step 701 after all GUI control information 209 have been checked, a dialogue indicative of a list of GUI controls whose properties are changed is displayed on the basis of the information acquired in the step 708 (step 804) and with confirmation of the changed object GUI controls selected in the step 701, a dialogue indicative of a list of the changed object GUI controls is displayed on the basis of the information acquired in the step 708 (step 805).

The synchronized GUI control property defining information 212 representative of the GUI control property defining information 201 which is in synchronism with the GUI control property defining information synchronization flag 211 owned by the GUI control information 209 is recognizable by a GUI control property confirmation dialogue displayed by the application window editor and the GUI control property defining information synchronization flag 211 is changeable on the GUI control property confirmation dialogue. When the GUI control property defining information synchronization flag 211 is rendered "off" on the GUI control property confirmation dialogue, the synchronize of the GUI control property defining information 201 with the property of the object GUI control is released and even when the GUI control property collective change menu 504 is selected on the application window editing screen 501, the latest GUI control property information 201 is not reflected upon the GUI control property information 210 of GUI control information 209 of the object GUI control. Conversely, when the GUI control property defining information synchronization flag 211 is rendered "on" on the GUI control property confirmation dialogue, the property of the object GUI control synchronizes with the GUI control property defining information 201 owned by the synchronized GUI control property defining information 212, so that when the GUI control property collective change menu 504 is selected on the application window editing screen 501, the latest GUI control property information 201 is set to the GUI control property information 210 of GUI control information 209 of the object GUI control.

According to the present embodiment, the GUI control property defining information 201 stored in the server 101 can be utilized by the application window editor 206 executed in the client 102 and therefore, the work necessary for making outwards of application windows consistent when a plurality of application windows are developed by a plurality of persons can be relieved.

As described above, through execution of the present invention, the development efficiency of application program can be improved during development work of an application program constructed of a plurality of application windows utilizing GUI controls by simplifying the operation of setting properties in respect of individual controls through the use of the GUI control property defining information which defines properties common to GUI controls used in individual application windows on the server and when the GUI control property defining information on the server is redefined, by collectively changing properties of GUI controls which synchronize with the GUI control property defining information to simplify the work of re-setting the properties of the GUI controls so as to improve the development efficiency of the application window.

What is claimed is:

1. A system of supporting development of an application window utilizing graphical user interface (GUI) controls, comprising:
a server for collectively controlling resources utilized for application development, said server including storage means for storing properties common to GUI controls; and
one or more clients connected to said server, via a network, for performing application development by utilizing said resources, each of said clients including:
a GUI control property defining information definer for defining said common properties of GUI controls to be stored in said storage means;
an application window editor for editing an application window by using said GUI controls; and
control means for reflecting said common properties of GUI controls stored in said storage means,
wherein said application window editor includes a flat which indicates whether each of GUI controls synchronizes with properties common to GUI controls, and
wherein said control means reflects said common properties of GUI controls stored in said storage means based on the flag indicated to synchronize with the properties common to GUI controls, when said common properties of GUI controls are changed.

2. A system according to claim 1, wherein said application window editor is further configured to retrieve, when said common properties of GUI controls are changed by said GUI control property defining information definer, a GUI control which uses said common properties of GUI controls before changing, and change the property of a GUI control as retrieved to common properties after changing.

3. A system of supporting development of application windows utilizing graphical user interface (GUI) controls, comprising:
 a server which stores GUI control property defining information containing GUI control types and properties of each of the GUI control types; and
 a client machine connected to said server, via a network, which supports development of an application constructed of one or more application windows each of which uses properties of a corresponding GUI control type from said server, said client machine comprising:
  a GUI control property defining information controller which includes a definer for defining properties common to the GUI control types to be stored at said server, and a selector for selecting a GUI control type which synchronizes with said properties common to the GUI control types defined by definer; and
  an application window editor which edits an application window by using the GUI control property defining information stored at said server, which includes a flag indicating whether the GUI control property defining information stored at said server is utilized for edits, and which changes the property of a GUI control type selected by said selector based on said flag when common properties of GUI control types are changed.

4. An application window development supporting system according to claim 3, wherein said GUI control property defining information controller is also configured to select the property which synchronizes with the selected GUI control type from said common properties of GUI control types defined by said definer.

5. An application window development supporting system according to claim 3, wherein said definer defines said common properties of GUI control types with respect of individual types of GUI control property defining information.

6. A computer program file embodied on a machine-readable medium transferred to a computer to use graphical user interface controls comprising:
 a processing unit for defining common properties of graphical user interface controls to be stored in another computer;
 a processing unit for developing application windows by using said graphical user interface controls in combination with a flag which indicates whether each of said graphical user interface controls synchronizes with properties common to said graphical user interface controls; and
 a processing unit for reflecting said common properties of said graphical user interface controls stored in said another computer based on the flag indicated to synchronize with properties common to said graphical user interface controls, when said common properties of said graphical user interface controls are changed.

7. A computer program file embodied on a machine-readable medium according to claim 6, further comprising:
 a processing unit for retrieving, when said common properties of graphical user interface controls are changed, a graphical user interface control which uses said common properties of graphical user interface controls before changing, and
 a processing unit for changing the property of a retrieved graphical user interface control to said common properties of graphical user interface controls after changing.

8. A system of supporting development of an application window utilizing graphical user interface (GUI) controls, comprising:
 a server which stores properties common to GUI controls; and
 a client machine connected to said server, via a network, which enables a user to develop an application program having one or more application windows by utilizing said GUI controls, said client machine including:
  a GUI controller which defines properties common to GUI controls to be stored at said server, and selects a GUI control which synchronizes with properties common to GUI controls defined; and
  an application window editor which edits an application window by utilizing said GUI controls stored at said server, which includes a flag indicating whether each of GUI controls stored at said server synchronizes with properties common to GUI controls, and which changes the property of a GUI control selected based on the flag when common properties of GUI controls are changed.

9. A system according to claim 8, wherein said GUI controller is an application program executed by said client machine including a user definer which defines properties common to GUI controls to be stored at said server, and a GUI selector which selects said GUI control which synchronizes with properties common to GUI controls defined.

10. A system according to claim 8, wherein said application window editor is an application program executed by said client machine to reflect properties common to GUI controls stored at said server, when the property of a new GUI control is added by a user.

11. A system according to claim 8, wherein said application window editor is an application program executed by said client machine to reflect properties common to GUI controls stored at said server, when said properties common to GUI controls are changed.

* * * * *